J. MAAS.
GAS LIGHT FIXTURE.
APPLICATION FILED MAR. 4, 1907.

910,556.

Patented Jan. 26, 1909.
6 SHEETS—SHEET 2.

Witnesses:
E. C. Schuermann.
N. M. Donn.

Inventor:
Joseph Maas,

J. MAAS.
GAS LIGHT FIXTURE.
APPLICATION FILED MAR. 4, 1907.

910,556.

Patented Jan. 26, 1909.

Witnesses:
J. C. Schuermann
N. M. Donn

Inventor
Joseph Maas
Hemmi & Goldsbrough,
Assoc. Attys.

UNITED STATES PATENT OFFICE.

JOSEPH MAAS, OF KALAMAZOO, MICHIGAN, ASSIGNOR TO AMERICAN GAS LIGHT COMPANY, OF KALAMAZOO, MICHIGAN, A CORPORATION.

GAS-LIGHT FIXTURE.

No. 910,556.  Specification of Letters Patent.  Patented Jan. 26, 1909.

Application filed March 4, 1907. Serial No. 360,456.

*To all whom it may concern:*

Be it known that I, JOSEPH MAAS, a citizen of the United States, residing at Kalamazoo, in the county of Kalamazoo and State of Michigan, have invented new and useful Improvements in Gas-Light Fixtures, of which the following is a specification.

My invention relates to improvements in gas light fixtures especially designed for a cluster of incandescent mantle lights of the class commonly known in the trade as gas arc lights, and particularly has reference to such a cluster of incandescent mantles in inverted form, the gas entering from above, and the parts of the structure presenting no obstacle to the downward passage of the light. Its objects are to accomplish such lighting by means more economical and efficient than other means now in use in the particulars hereinafter pointed out. These objects I accomplish by the mechanism and assembling of parts shown in the accompanying drawings.

In these drawings

Figure 2:
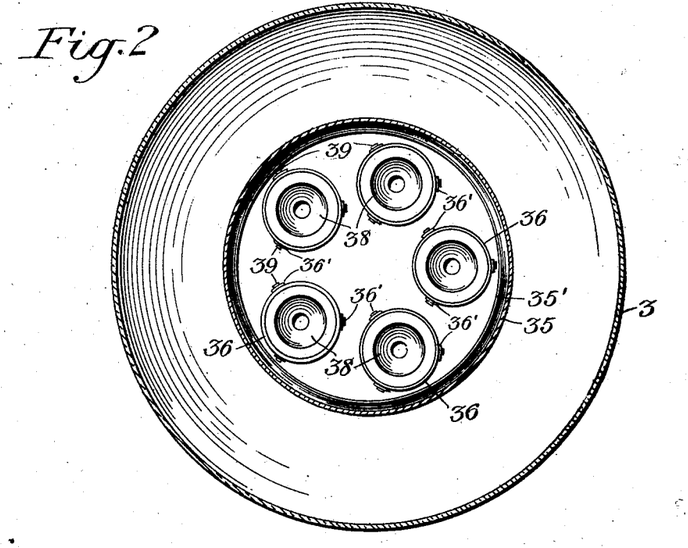
Fig. 2 is a horizontal section of the same parts taken on the line $z$—$z$ of Fig. 1, and looking downward as indicated by the arrow so as to show also some parts which lie below that plane.

In the operation of this class of so-called gas arc it is customary that there should be a cluster of incandescent mantles, which cluster may be composed of any convenient number. I have illustrated, as especially indicated in Fig. 2, a cluster of five of such mantles. It is also desirable that such a cluster of mantles be provided with means by which one of them may be lighted and burned independently of the cluster when a smaller amount of light is desired, for a night light or any similar purpose. It is also customary to provide means, usually in the form of so-called pilot lights, by which the gas may be at any time ignited without the application of external lighting means. All these objects are provided for in this device by mechanism especially suitable therefor.

This fixture is intended to be suspended or hung from a depending gas supply pipe. The incandescent mantles themselves are protected from injury and from drafts by the transparent, semi-spherical globe 3, and a large portion of the light which passes upward from the mantles is reflected again downward through this globe from the reflector 4. This reflector may be made of any suitable material for that purpose, so-called opal glass being especially suitable on account of its attractive appearance combined with its capacity for reflecting the light. It is apparent that by this general arrangement of parts, nearly all of the light from the mantles will be thrown, either directly or by reflection, downward through the transparent globe without obstruction or interference by any of the parts of the structure.

5 represents a suitable branching pipe or casting with a hollow interior, and connected by the screw-threaded nipple 5' to the main depending gas-supply pipe. This pipe or casting 5 is continued downward in opposite arms or pipes 6 and 7. These two depending arms serve as a bracket or hanger, by which the remainder of the structure is supported and held in position, and one of them, as 6, also serves as the pipe or passage-way for supplying gas to the fixture through the valve mechanism hereafter described.

Figures 11, 13, 14:
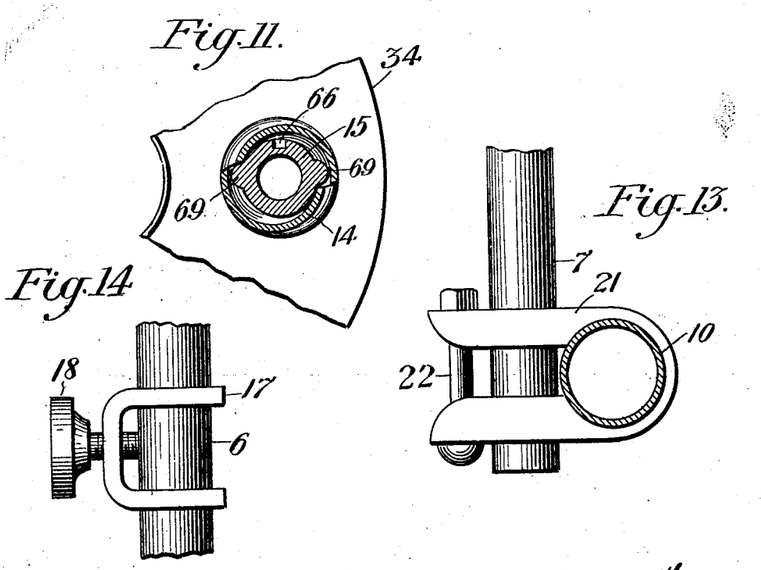
Fig. 11 is a similar cross-section on the line $k$—$k$ of Fig. 9.
Fig. 13 is a detail of one of the clamps shown in Fig. 1.
Fig. 14 is a detail of another of these clamps.

The numeral 1 represents the exterior shell or casing surrounding the upper part of the structure. It is preferably made of metal and may be struck up or pressed into any suitable and ornamental form. It comes down far enough to meet the inclosing portions of the structure which come up from below so that the two together, the upper shell and the lower inclosures, completely surround most of the assembled parts. It is important that this shell or casing should be capable of being raised out of the way, to get at the interior parts. I accomplish this by clamping it to the hanger supports 6 and 7, so that it may be vertically adjusted thereon. This is accomplished in the form shown in the drawings, by the clamps 17 and the set screws 18. These are shown in detail in Fig. 14 and do not need further description. It is apparent that by their use the shell or casing may be released and raised and held in raised position, and then again lowered and held in the lowered position.

Figure 1:
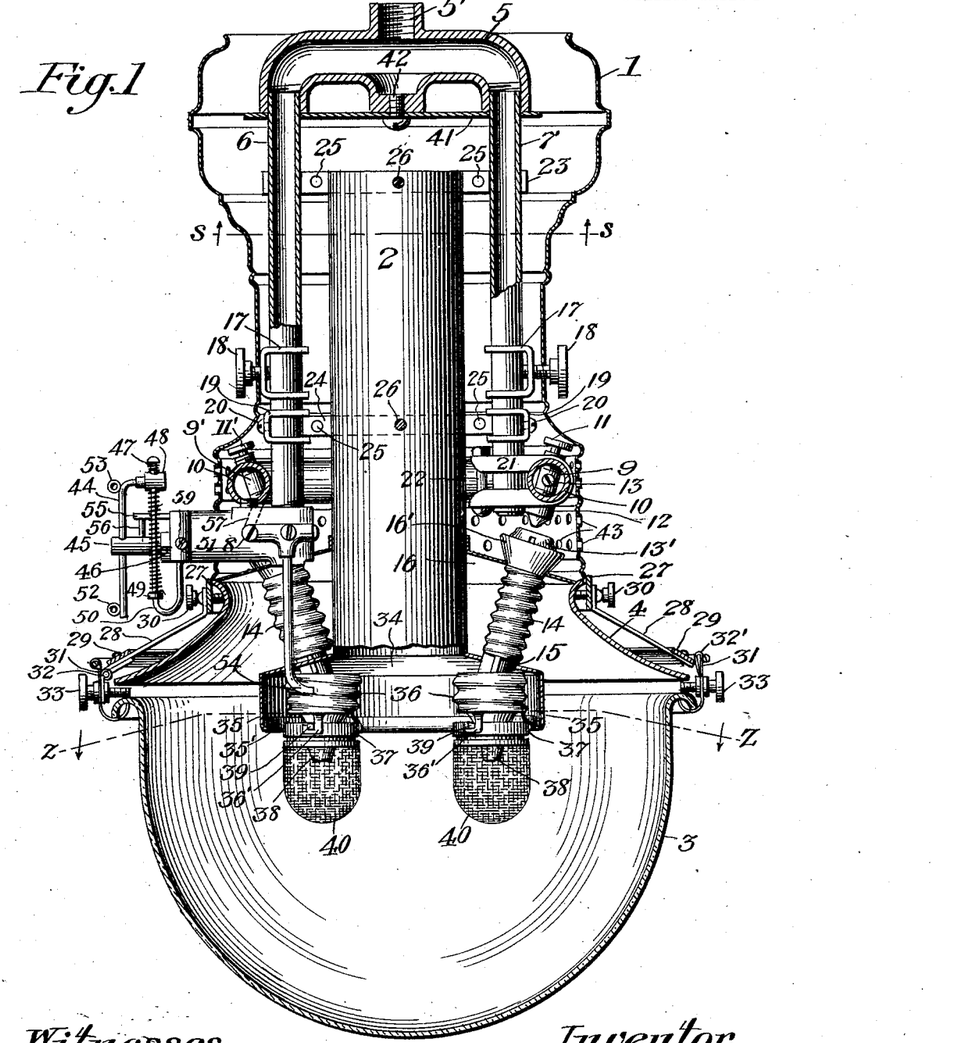
Figure 1 is a side elevation of my complete structure, with all the parts assembled as designed for use, and showing some of the parts in section, as particularly indicated in the figure.
Figure 3:
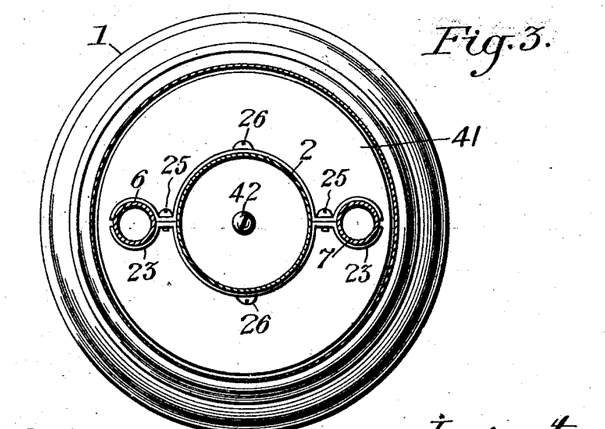
Fig. 3 is a horizontal section of the same on the line $s$—$s$ of Fig. 1 looking upward as indicated by the arrow.

For supplying the proper air to the mantles, I provide the outer shell with a series of air openings or ports, which I have shown in the form of round holes 43 in Fig. 1, piercing the shell and admitting the external air to the interior near the top of the Bunsen tubes, through which it will, mingled with gas, then naturally pass downward to the interior of the incandescent mantles. The cluster of mantles, or rather the cluster of burners from which the mantles depend, is surrounded by a band, preferably of metal, and shown in the drawings of circular shape indicated by the numeral 35. Upon its upper edge this band is developed into a conical plate 34 extending inwardly for a distance and terminating at its interior in a flue or chimney 2. These parts 35 34 and 2 are preferably integrally constructed. This flue, or chimney, with all its attached parts, is capable of vertical adjustment by means of its sliding attachment to the bracket-hangers 6 7. Two opposite semi-cylindrical bands 24 are passed around the chimney, each being riveted or fastened thereto at 26. The two parts of the band are extended and connected by bolts 25, and then nearly encircle the pipes 6 and 7. This is clearly illustrated in Fig. 3, with reference to the similar band 23, which holds the upper part of the chimney and keeps it centrally located as it is vertically adjusted, the extended curved ends of the band 23 sliding up and down on the pipes 6 and 7. The band 24, and thereby the flue and the attached parts, are held in the desired position with reference to the hangers 6 and 7 by clamps 19 in connection with set-screws 20. This chimney or flue, by means of its attached plate 16, as hereafter described, carries the burners, and it is evident that vertical adjustment of the flue by clamps 20 will vertically adjust the burner and will bring the upper ends of the burner tubes nearer to or farther from the gas nozzles, as may be desired, and in the manner hereinafter described.

The products of combustion from the mantles and a portion of the air, admitted over the top of the globe or elsewhere, and heated by the mantles, passing up the flue and being discharged at the top thereof, would naturally come in contact with the main portion of the gas supply structure 5, and thereby would heat to a high degree the gas entering through 5. Such excessive heating of the gas supply to the structure would be injurious and would reduce the efficiency of the gas, for well-known reasons, and I therefore avoid this difficulty by providing a deflector-plate 41, which is attached by the screw 42 to the structure 5, and operates to deflect the intense heat away from this structure and out into the annular surrounding space within the expanded portion of the shell or casing, and the heat then escapes through the open, upper end of this case, all as shown by Fig. 1. In this way the objectionable heating of the entering gas is avoided.

Rigidly attached to the flue or chimney, 2, near the lower portion thereof and surrounding such flue, is the depending conical plate 16. At its lower outer edge, and suitably attached thereto, this conical plate carries the depending annular flange 27. This flange, or band, 27 also forms a support for the above described shade or reflector 4. The latter is formed with a neck, as shown, and the screws 30, passing through the band 27 and into this neck, support the reflector, while by removing the screws, partially or wholly, the reflector may be disconnected and dropped. These screws 30 also connect the band 27 with depending outwardly flaring arms or bars 28 28, which expand in form corresponding to the expansion of the reflector 4, and which are connected at or near their lower ends, and thereby given the necessary rigidity and stiffness, by the annular band 29. The transparent globe 3 has its upper edge turned over and outwardly, and this engages with the converse inwardly-curved lip of the ring 31, whereby the ring 31 supports the globe 3. The set screws 33, passing through the ring 31, contact with and hold the globe in its proper position, while their removal permits the globe to be passed through the ring and removed, when the supporting ring 31 is swung down on its hinge so as to be vertical. The ring 31 is at one side hinged, as shown by 32, to the supporting bar 28, and at the other side a suitable spring clasp indicated by 32' detachably connects the ring 31 and the bar 28. It is evident that when this clasp is disconnected, the globe will swing downwardly on the hinge 32 and thus permit access to the cluster of mantles and nearby parts.

10 represents a tubular ring lying between the external shell and the hanger supports 6 and 7, and preferably surrounding the latter. I prefer, also, to make this ring continuous, so that there will be no dead end, and so that the gas, on entering, may flow in either direction and reach every burner by the path of least resistance. This ring 10 I call the gas ring because it acts as the conduit or supply pipe for the gas from the valve toward the burners. It is adjustably attached to the bracket-leg 7 by the clamps 21 22, shown in detail in Fig. 13; and by the use of this clamp, it may be adjusted in exactly the required position, by rocking it slightly, either laterally or vertically, on its connection 10' with the valve casing 8, so as properly to aline and space the valves 9 and the Bunsen tube heads 13'.

Figure 5:
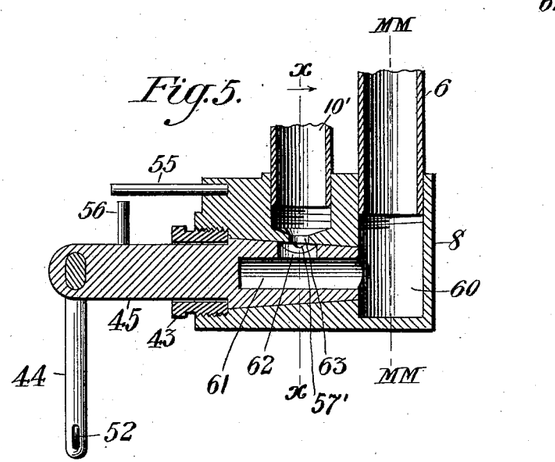
Fig. 5 is a vertical cross-section of Fig. 4 on the line $y$—$y$ of that figure.
Figure 6:
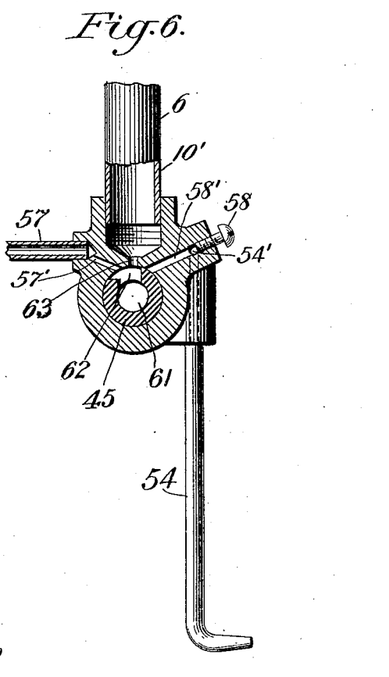
Fig. 6 is a vertical cross-section of the parts shown in Fig. 5 on the line $x$—$x$ of that figure, and an elevation from the same plane looking in the direction indicated by the arrow.

At a suitable point, the supply-pipe and bracket-leg 6 enter the valve-casing 8. The method of entry is shown in detail in Figs. 4, 5 and 6, and particularly in Fig. 5. The gas thus enters the interior chamber 60 of such valve-casing and is normally always there present. From this permanent gas chamber 60 a port 75 leads transversely through the side of the valve-casing and communicates with the right-angled port or conduit 54' which is longitudinal of the valve-casing. The flow of gas through the port 75 is regulated by set-screw 76, and it is evident that this port 75 is normally always open. A very small amount of gas is permitted to pass therethrough by adjustment of screw 76, and this gas passes through port 54' into the pilot tube 54 and thereby supplies the constantly burning pilot light at the tube extremity $54^2$. The valve-casing 8 is suitably bored out, preferably with a taper bore, as shown in Fig. 5, to receive the revolving valve 45. This valve is held in position, and in gas-tight revolving contact with the valve-casing, by the external screw-threaded collar 46, engaging with an internal thread at the opening of the bore, and with a suitable shoulder on the valve, as shown.

61 is an opening, preferably bored cylindrical in form into the inner end of the valve longitudinally thereof, and always communicating freely with the gas chamber 60, so that there will always be gas in this valve chamber 61.

62 is an opening or port through the side or shell of the valve, opening on the inside into the chamber 61, and opening at the outside into the different ports with which it may be successively brought into connection.

Figure 4:
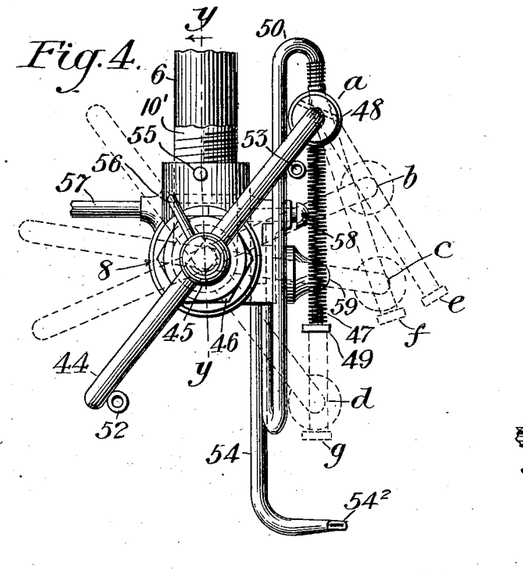
Fig. 4 is a side elevation of the valve-casing and attached parts, showing the same as viewed from a point which would be at the side of Fig. 1, and indicating by the dotted lines the various progressive positions of the parts, in operation as hereinafter described.
Figure 8:
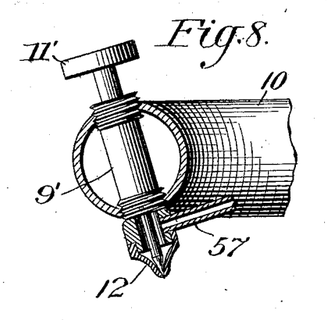
Fig. 8 is a similar view of another valve supplying the independent burner, as hereinafter described.

In the rotation of the valve from the starting position shown and occupied by the operating lever 44 in Fig. 4, and by the slide 48 indicated by $a$ through the intermediate stages there shown to the final position indicated by the letters $d$ and $g$, the valve port 62 will first make connection with the port 57' leading to the conduit 57. It will thus make connection with 57' 57 at the moment when the arm 56, projecting laterally from the revolving valve, makes contact with the spring arm 55, projecting at right angles to 56 from the valve-casing. When thus these two parts 55 and 56, which I call the feeler spring, or indicator spring, come in contact and stop the revolution of the valve, it will indicate that the port 57' 57 is open for the passage of gas, and that the other ports herein shown are not open. This conduit 57 leads, as indicated in Figs. 1, 4 and 8 into connection with the valve 9' supplying gas to the nozzle of that valve; and this valve 9' supplies gas, properly mixed with air in the manner hereinafter described, to that one of the burners which is located in close juxtaposition to the permanent pilot light in the pilot tube 54. Thus it will be seen that when the chain which is attached at 53 to one end of the valve lever 44 is pulled down until the parts of the feeler spring 55 56 make contact and check, and for the time being stop, the downward motion, gas will be supplied to one burner and mantle out of the cluster, and this one, and this one only, will ignite from the pilot light and become incandescent, and thus will furnish the one light especially suitable when only a small amount of illumination is desired. This single light feature also operates conveniently in the converse way. After all the mantles of the cluster have been burning and then the valve lever 44 is, by a chain pull at 52, reversed from the position shown by the letters $c f$ to the position shown by the letters $b e$, which is at the same point where the parts of the feeler spring make contact in the reverse motion, the gas will be shut off from all the illustrated ports excepting 57', which will continue to supply gas to its independent burner and mantle, and this mantle will continue incandescent while all the others of the cluster cease to burn.

As the revolution of the valve is continued by continuing the downward pull upon the chain at 53, the spring 55 will yield, and the arm 56 will pass by it, and the revolution will continue unobstructed. The valve port 62 will then come into connection with the port 63, shown in Figs. 5 and 6, which opens through the valve-casing into a screw nipple 10', through which it connects with the gas ring 10, and gas is thus supplied to all the burners, excepting the one burner which is independently connected through the port 57. A proper volume of gas and air in suitable proportions is thereupon, in the way hereafter described, supplied to all of the other mantles, entering through the mantle nozzle 38 with a downward blast, and secondarily, also, rising from the mantles to the level of the pilot light at the end of the tube 54. At the end of this pilot tube I make horizontally opening apertures indicated in Fig. 4 by $54^2$ so that the gas as it comes through 54, if in some considerable volume and under some pressure, will blow or extend itself laterally, and the flame therefrom ignited by the constantly burning pilot light will extend laterally far enough to reach all of the cluster of burners.

When the valve lever 44 has reached the point, indicated by letters $c f$, at which the port 63 is alined with the port 62, and the gas is thus supplied to the gas ring, the sleeve or slide 48, which has been traveling downward upon the coiled spring 47, has reached and is stopped by the shoulder 49 upon the lower end of the spring, as shown by $c f$ in Fig. 4. A continuance of the downward pull upon the chain at 53 causes this coiled spring to expand longitudinally and permit the parts to take the position shown by the dotted lines indicated by $d g$. The additional revolution of the valve thereby caused alines the port 62 with the port 58', which extends through the casing 8 at approximately right angles to its length. This port 58' enters the port or conduit 54' bored in the casing longitudinally thereof, and approximately at right angles to 58'. Set screw 58 governs and regulates port 54' and permits it to be closed partially or entirely, as desired. Through the port 58' 54', thus made up, the gas enters the pilot tube 54, and when thus entering under the pressure which will be exerted when these ports are open, a much larger volume of gas will be supplied to the pilot tube than required for the normal pilot light, and such gas and such pressure will cause the pilot flame to expand laterally from the slotted opening $54^2$ as described, and ignite the gas at all the burners. It is to be noted that this lateral expansion, by my construction, is caused after the gas has been supplied by the means described to all the burners; and there is distinct advantage in thus providing the burners with the gas in advance of this extension of the pilot flame.

Immediately upon relieving the downward pull upon the chain at 53, the tension of the coiled spring 47 contracts the same and automatically returns the parts to the position indicated by $c f$, whereby port 58' 54' is automatically closed and the abnormal supply of gas for the flash pilot and the expanded flame therefrom ceases to burn. Only the normal and minute pilot light supplied by the ordinary means not illustrated, remains burning at this point.

In connection with the operation of the valve 44 it will be observed that the valve-casing has attached thereto by suitable set-screw 59 a rod or bar 50 which depends from the point of attachment, as shown in Fig. 1, and then rises vertically, as shown in Fig. 4, curving at its upper end. This rod is vertically adjustable by means of set-screw 59, shown in Fig. 4, which enters the threaded hole therefor bored in the body of the casting, as indicated by 51 in Fig. 1. The coiled spring 47 is attached to this curved upper end in any suitable manner. This coiled spring not only operates as described, permitting its length to be increased and automatically returning to normal length, but its construction permits it to swing outwardly as becomes necessary in the operation before described, and enables it to take the respective positions indicated by $e, f$ and $g$ in the dotted lines in Fig. 4. It is apparent, also, that in the passing of the slide 48 over the spring there will be, if there is ordinarily close sliding contact between the slide and the spring, considerable friction, materially increasing as the spring swings outwardly from its vertical position. I have found that this friction thus existing is important and useful in maintaining the parts in the position indicated by $c f$. This is the normal position after the cluster of burners has been lighted, but the rebound from some other position, or the jar affecting the building, or other cause, would be likely to change the parts from this position and cause the ports to open or close in an undesired manner, unless some lock is provided for keeping the parts in this position. I find that the friction between the spring and the slide at this point is sufficient to operate as such lock to the desired extent, while not at all interfering with the manual shifting of the parts to some other position. In the same way, when the parts are in the position shown by the solid lines in Fig. 4 and all ports, except the non-illustrated port leading to the permanent pilot, are closed, downward motion of the slide 48 upon the spring can not commence without forcing the spring sidewise out of its vertical position, and thereby causing some friction, and I find that this frictional effect also is sufficient, in a practical way and as far as practically necessary, to lock the parts in this position until they are manually moved.

Figure 7:
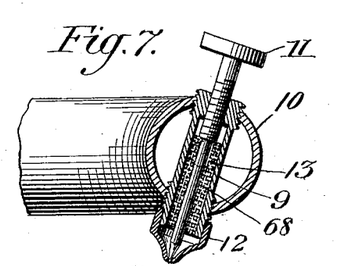
Fig. 7 is a detailed view showing in cross-section one of the valves supplying one of the regular series of burners, and including a perspective view of the part to which it is attached.
Figure 9:
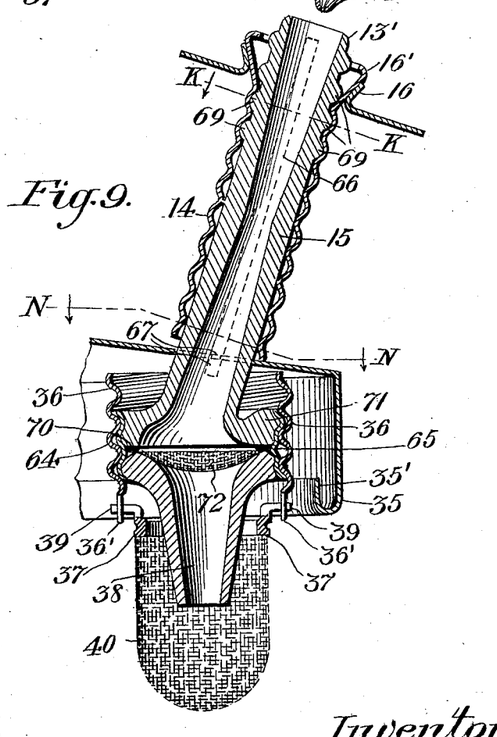
Fig. 9 is a vertical cross-section of the burner combination.

9 9' are gas valves of the needle class, the needle point being located respectively by the heads 11 11'. This construction is shown in Fig. 1 and in Figs. 7 and 8. The valve 9' as already described, is independent of any gas connection with the gas ring 10, and is only shown inserted therethrough for convenience of location. All the other valves, however, as represented by valve 9, are provided in their sides with ports 13, opening freely into the interior of the gas ring, whereby gas passes from the gas ring into the interior tubular portion of the valves. All these ports 13 are screened by wire gauze 68 in the interior of the valve tube, and lying around the interior wall thereof. By the use of this screen the passage of impurities which might clog or injuriously affect the passage of gas through the gas nozzle, is prevented. These valves are passed through the gas ring with screw-threaded connections, as shown in Figs. 8 and 9, and the gas nozzle 12 is attached to the lower end of each valve tube, such attachment being made in any suitable manner which permits the gas nozzle to be easily removed from the tube. A slip connection is shown.

It will be apparent that by the construction, as so far described, the gas under pressure fills the interior of the gas ring 10, enters the valve tube 9, and passes out of the opening in the tip of the nozzle 12, under strong impulse in the line of the axis of the valve tube 9. It is a valuable feature of this fixture that this nozzle 12 can be removed without interfering with any other part of the lamp, and when the nozzle is thus removed the screen 68 can also be removed and cleaned, and these parts of the device can thus easily be kept in perfect order. The gas, under this described impulse, now enters with a downward blast the upper end of the Bunsen tube 15. The upper end, or head, of this tube is indicated in the drawings by 13'. The space between the tip of the nozzle 12 and the head 13' is such that air is drawn into the Bunsen tube 15 with the gas in this downward blast, and the air and the gas are mixed, in proper proportions for use in connection with the incandescent mantle. The adjusting of the tube 15 to and from the nozzle tip in the manner hereinafter described, permits the exact regulation and adjustment of the amount of air to be admitted. The conical plate 16 is provided, at the point over each burner, with a suitable opening with a flaring edge, as shown in Fig. 9.

Figure 10:
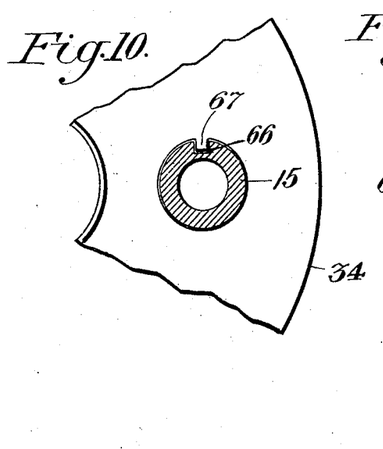
Fig. 10 is a horizontal cross-section of Fig. 9 at the top of plate 34, and looking down thereon from the plane N—N of Fig. 9.

14 is a loose sleeve provided with an outwardly flaring upper end, indicated by 16'. The value of this relative construction, as illustrated, of these openings in 16 and of the flaring head 16' is that the plate 16 is so enabled to support and carry the sleeve 14 hanging therein, and at the same time making close contact between the plate and the sleeve, so that the heated air cannot pass up therethrough and cannot be drawn into the upper end of the Bunsen tube. This sleeve 14 is internally threaded. I have shown a tube struck up out of metal, so that the thread is also external, but the external portion of the thread is not operative. This sleeve 14 loosely surrounds the Bunsen tube 15, and the latter is provided at any suitable point with lugs or knobs 69, which enter and travel in the interior thread of the sleeve 14. Inasmuch as the sleeve 14 hangs loosely in the plate 16 and can be revolved therein, it is evident that the revolution of the sleeve causes the knobs 69 to travel in the grooves of the sleeve, and thereby the tube 15 will be moved longitudinally of the sleeve 14. This result is in part accomplished by the co-action of the longitudinal slot 66 in the side of the Bunsen tube, and the tongue 67 in the lower plate 34, as especially illustrated in Fig. 10. This tongue moves longitudinally in the slot, or the slot moves longitudinally upon the tongue, and thereby the revolution of the Bunsen tube 15 is prevented, while longitudinal motion is permitted. The conical plate 34, attached to and flaring from the bottom of the chimney or flue, is also provided with suitable openings of substantially the proper size to receive the Bunsen tubes 15 and permit the same to move longitudinally up and down through the plate 34. This is particularly illustrated in Figs. 9 and 10. The Bunsen tube carries upon its lower end, and preferably integral therewith, an expanded foot 71 (Fig. 12) of suitable dimensions and shape, and which I have shown having an external screw-thread, that being one convenient means of the attachment hereafter described. This Bunsen tube, with its head, as shown, and its expanded foot, may be made of metal in any suitable form, or of other material, porcelain having been found to be especially suitable for such use.

38 is a burner nozzle of suitable form to concentrate and discharge downwardly in contact with the mantle the mixture of gas and air which is supplied thereto through the Bunsen tube. If desired, a wire gauze, or other suitable screen, may at this point also close the passage, as shown in Fig. 9 by 72, thereby additionally providing against injurious matter being permitted to enter the mantle. This screen also prevents lighting back. The burner nozzle 38 is expanded at its upper part to be of shape corresponding to the tube foot 71, and, if it is desired, to be clamped thereto in the position shown in Fig. 9. I accomplish this clamping of the two parts by providing a screw-thread, as stated, upon the exterior of the foot 71 and also upon the upper part of the nozzle 38, the latter thread being shown in Fig. 12 by 64', and by clamping the two together with the screw-threaded sleeve 64. A suitable groove 65 at the union of the two parts 71 and 38 and a corresponding inwardly projecting flange upon the screw sleeve 64 locates the sleeve centrally of the two parts.

I also provide an asbestos, or other suitable packing ring, between 71 and 38 in order to make a tight joint, this packing being shown by 70.

36 is a sleeve internally screw-threaded and making internal contact with a similar external thread on the binding sleeve 64. The sleeve 36 can thus be vertically adjusted with reference to the burner nozzle 38. From the sleeve 36 depend a suitable number of hooked mantle-support hangers 36' and in these hangers the mantle-support 37 is hung by means of the ears 39 on the mantle-support. These ears rest upon the hooks on the lower end of hangers 36' and the mantle 40 is attached to and hangs from the mantle-support 37. The mantle and its support can thus be hung from the sleeve 36 and at any time when desired the mantle-support and the mantle can be lifted out of engagement with the hooks and removed. It is evident that when they are thus in engagement, the revolution of the sleeve 36 will raise or lower the mantle relative to the mantle nozzle 38, in this way compensating for variations in the gas pressure.

It is apparent that by the structure as described the mixture of gas and air will be driven down through the Bunsen tube and through the mantle nozzle 38, and in its downward course will continue at least as far as the lower end of the hanging mantle. It will then rise along the sides of the mantle, and thus fuel will be constantly furnished to keep the mantle incandescent.

Figure 12:
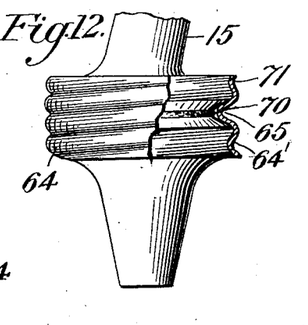
Fig. 12 is a detail showing the parts 15 and 38 of the burner combination and the method of their connection.

It is important to have the gas-supplying parts, and particularly in this construction, the gas ring and the upper end of the Bunsen tubes as far removed as possible from the heat caused by the burning of the gas at the mantles; and it is, therefore, desirable not to locate these gas-supplying parts immediately above the mantles. On the other hand, it is necessary to bring the cluster of mantles as close together as can be done, thereby increasing the brilliancy of illumination. I accomplish these two objects, and at the same time leave free a central space for the upward passage of the heat, by the construction shown, in which the Bunsen tubes are located at an angle from the vertical, their lower ends and the burners carried thereby being close together, while the upper ends are much further separated. These upper ends, as described, are hung in and supported by the conical plate 16. The expanded foot 71 of the Bunsen tube will therefore be shaped substantially as indicated in Figs. 9 and 12, and the expansion will not be at right angles to the length of the tube, but at such an angle that the expanded portion will be horizontal and of such form that its external surface may be substantially vertical, and thus permit the use of a suitable clamp attachment to the mantle-nozzle 38. It is evident that with the angling construction shown, as the Bunsen tube is raised or lowered by revolving the sleeve 14, the foot of the tube and the attached parts will move mainly in a vertical direction, although they will have a comparatively slight lateral motion. By this construction, also, I can, if I desire, lower one of the Bunsen tubes and the mantle carried thereby for nearly the full length of the tube, and bring it down separate from the other mantles of the cluster, so that attention can be given to these parts, or a mantle removed and replaced without danger of accidentally injuring the other mantles of the cluster. Indeed, if it is desired, the Bunsen tube and attached parts can in this manner be entirely removed in this downward way, and without disturbing any other parts. Such removal may be desirable in cleaning or readjusting so that the parts will work perfectly.

Figures 15, 16, 17:
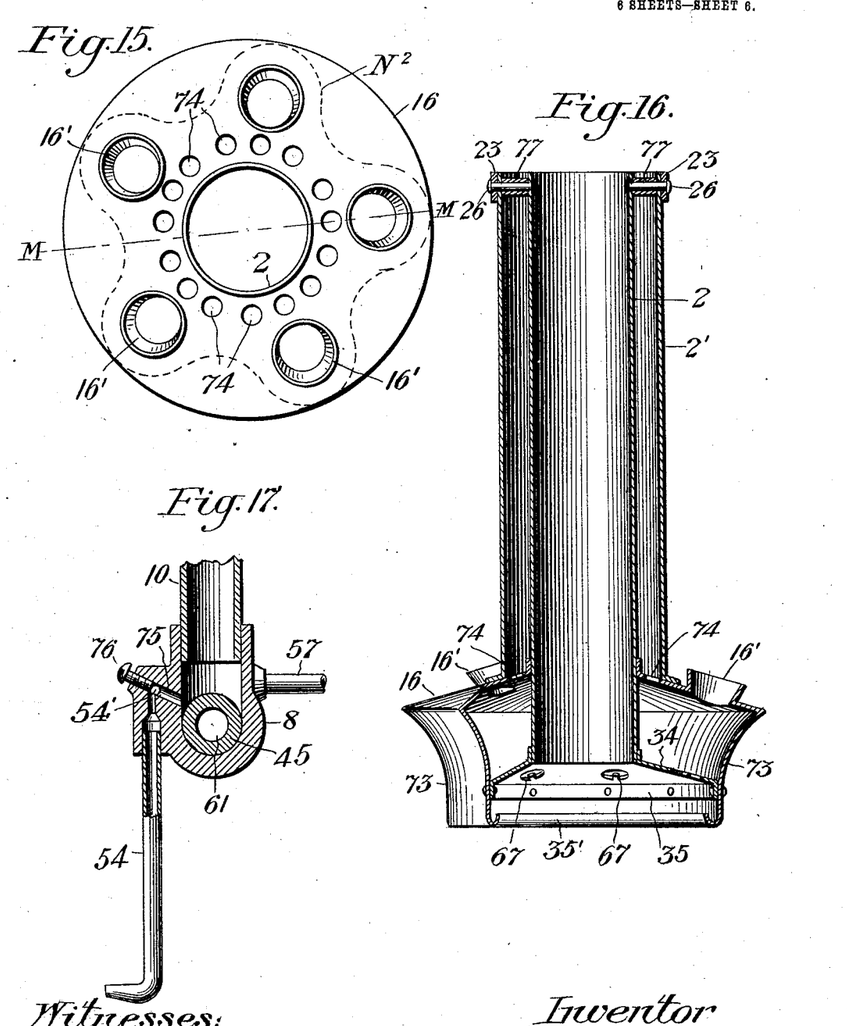
Fig. 15 is a detail of my preferred form of the conical burner-supporting plate, and is a top elevation thereof looking down upon the same.
Fig. 16 is a side elevation of an alternative form of the central flue and some of the attached structures on a line corresponding to M—M of Fig. 15.
Fig. 17 is a vertical sectional view of Fig. 5 on line MM—MM of that figure.

The conical plate 16, the position of which relative to other parts, is shown in Figs. 1 and 9, I prefer to construct in the form shown in Fig. 15. That portion of the heat from the burners which is not drawn into and carried up the central flue, will rise into and through the deflector 4 and into the chamber, the top of which is the plate 16. In order additionally to provide for a free circulation of air here and keep the Bunsen tubes cool and keep the air cool at the point where it enters the head of the Bunsen tube, I provide the plate 16, in the form shown in Fig. 15, with numerous openings surrounding the central flue, and permitting this portion of the hot air to pass up through the openings and thus not to accumulate and become overhot around the tube and not excessively to heat the plate 16, and thereby the air entering the top of the Bunsen tube. These openings should be as free as possible, between the Bunsen tubes and the central flue, so as to tend to draw this hot air away from the tube and up through the plate 16. The taper hanging connection made between plate 16 and sleeve-head 16' results in a slight wedging of the latter in the former. It follows that no slight motion, like the jar of a factory building, will cause undesired revolution of the sleeve 14; while at the same time it can easily be lifted out of this wedge contact and will then freely revolve. The angling form of the Bunsen tube and surrounding parts also tends to prevent undesired change of location by jarring or accidental motion, since the pitch (relative to a horizontal plane) of the threads in the interior of the sleeve 14 will, for part of its circumference, be more difficult to traverse by the knobs 69 than if the sleeve was vertical; and hence accidental revolution of the sleeve with reference to the tube will be less probable.

With reference to Fig. 4 it will be observed that the bar 50, owing to its form and location, acts as a stop for both the upward and downward motion of the valve-lever; and as the lever then comes in contact, at both extremities of the stroke, with what is for this purpose, an integral member of the valve-case, no independent or separate stop-mechanism is required.

If there is any tendency in the heated air passing upward through opening 75 (Fig. 15) in plate 16, to be drawn into the upper ends of the Bunsen tubes, I can avoid such tendency and at the same time additionally guard against undesirable heating by using the double flue shown in Fig. 16, thus providing a supplemental annular flue. It will be attached to the supporting brackets in the way illustrated in Fig. 1, but the attaching bands will pass through the supplementary flue in the manner indicated by 77, Fig. 16. This supplementary flue I have indicated by the numeral 2'. I also may provide the additional deflector 73, connected at its upper outer edge with the plate 16 and extending downwardly and inwardly so as to make suitable contact with flange 35 and embrace and protect the tubes of the burners. This deflector or shade may be circular in form, or it may have the irregular form shown by the dotted lines in Fig. 15 and also illustrated in Fig. 16.

Having thus described my invention, what I claim to have invented, and desire to secure by Letters Patent, is—

1. In a gas light fixture, the combination of the entrance supply pipe, the depending bracket-arms branching therefrom, the exterior upper shell surrounding such depending arms and adapted to be moved to give access to the interior structure, the central combustion product flue attached to and carried by the bracket-arms, the lower, burner-inclosing structure, the cluster of burners, means including valved nozzles for supplying gas to the burners from the entrance pipe, and means independent of said nozzles for adjustably supporting said burners.

2. In a gas light fixture, the combination of the entrance gas supply pipe, branching bracket-arms depending therefrom, a cluster of burners, means including valved nozzles for supplying thereto gas from the entrance pipe, means independent of said nozzles for supporting said burners, the central combustion product flue, means for adjustably attaching the flue to the bracket-arms, and a deflector-plate above the top of the flue adapted to protect the entering gas from the heat discharged from the top of the flue.

3. In a gas light fixture, the combination of the supporting bracket-arms, a lower burner-inclosing structure supported and carried by the bracket-arms and comprising a deflector shade and a hinged globe, an upper exterior shell supported by and adjustable on said bracket-arms, a central combustion product flue attached to and supported by the bracket-arms, means attached to such central flue for supporting and carrying burners, a cluster of burners supported and carried by such means, an expanded lower portion of such flue surrounding such burners, and means independent of the burner supporting means for supplying gas to the burners.

4. In a gas light fixture, the combination of the entrance supply pipe, bracket hanger-arms depending therefrom, the upper exterior shell surrounding, supported by and adjustable on such hanger-arms, the central combustion product flue attached to and carried by such hanger-arms, a depending outwardly and downwardly flaring reflector shade, means for supporting and carrying such reflector shade upon such central flue, a transparent globe below the reflector shade and carried by the supporting means for said shade, a cluster of burners within the globe, and carried by the shade support, and means independent of the burner support for supplying gas to said burners.

5. In a gas light fixture, the combination of the depending bracket hanger-arms, a central combustion product flue, means whereby such flue is supported and carried by such hanger-arms, an outwardly and downwardly flaring reflector shade, means whereby the same is attached to and carried by the central flue, outwardly and downwardly flaring globe supporting-arms attached to the shade carrying means, a transparent globe below the reflector, a hinged connection for one of such globe-supporting arms, a detachable connection between such globe and the opposite arm, a cluster of burners and means for supplying gas thereto.

6. In a gas light fixture, the combination of the entrance supply pipe, bracket hanger-arms depending therefrom, a central combustion product flue between such hanger-arms, adjustable clamping means connecting such flue to such arms, whereby the flue may be vertically adjusted upon the arms, means attached to the flue for supporting and carrying a cluster of Bunsen burners, a cluster of Bunsen burners supported and carried by such means, gas supply nozzles for the tubes of such Bunsen burners, which gas supply nozzles are attached to and carried by the bracket hanger-arms, and means for supplying gas to such nozzles, whereby, by adjusting the relative position of the central flue and the bracket hanger-arms, adjustment is made of the relative position of the gas supply nozzles and the tubes of the Bunsen burners.

7. In a gas light fixture the combination of the entering gas supply pipe, bracket hanger-arms depending therefrom, an endless tubular ring carried by such bracket hanger-arms and connected thereby with the supply pipe, a cluster of Bunsen tube burners, a series of valved nozzles supported and carried by such ring for supplying gas to the tubes of the burners, means whereby the cluster of burners is supported and carried by the bracket hanger-arms, and means for adjusting the relative position of the tubes of the Bunsen burners and the nozzles of the gas supply valves.

8. In a gas light fixture, the main gas supply pipe, a controlling valve therefor, the secondary gas supply pipe connected with the main pipe, a series of tubes passing transversely through such secondary gas supply pipe, nozzles upon such tubes, needle valves in said tubes, the tubes having openings through the sides thereof serving as ports through which the gas from the secondary supply pipe enters the transverse valve tubes, a series of Bunsen burners, and means for holding said burners in operative relation to such valve tubes.

9. In a gas light fixture, the combination of the main gas supply pipe, the secondary gas supply pipe, a valve controlling and regulating the passage of gas from the former to the latter, a series of tubes passing transversely through such secondary supply pipe, said tubes having ports therein, needle valves in said tubes and nozzles with which said valves coöperate, a series of Bunsen burners mounted in operative relation to said nozzles, and means for detachably and adjustably holding such transverse valve tubes inserted through such secondary supply pipe.

10. In a gas light fixture, the combination of the main gas supply pipe, a secondary gas supply pipe, a valve controlling the admission of gas from the former to the latter, a series of tubes passing transversely through such secondary supply pipe, said tubes having ports in the sides thereof communicating with the interior of the secondary gas supply pipe, needle valves in such tubes and nozzles thereon, screens detachably inserted in the interior of such tubes and screening the ports therein, and a series of Bunsen burners mounted in operative relation to such valve tubes.

11. In a gas light fixture, the combination of a main gas supply pipe, a secondary gas supply pipe, a valve controlling the admission of gas from the former to the latter, a series of tubes inserted transversely through such secondary supply pipe, said tubes having ports in the sides thereof, needle valves in such tubes, detachable nozzle tips for said tubes, and a series of Bunsen burners held in operative relation to such valve tubes.

12. In a gas light fixture, the combination of the entering supply pipe, a cluster of burners, intermediate passages conveying gas to such burners, a valve interposed between the main supply pipe and such intermediate passages, and a pilot light tube normally connected with the main supply pipe, said valve having means whereby a partial revolution of the valve supplies gas to one of the burners, a further revolution of the said valve supplies gas to others of such burners, and a further revolution of said valve supplies additional gas to the pilot light tube.

13. In a gas light fixture, the combination of a hanger support, an entering supply pipe, a tubular ring connected with said pipe, a cluster of Bunsen burners, means for supporting the burners independently of the tubular ring, a valve controlling and regulating the passage of gas from the pipe to the burners, means for supplying to the upper end of the Bunsen tubes a downward blast of properly mingled gas and air, mantles at the lower ends of such tubes, means for supporting the upper ends of such tubes at a given distance from the central line of the hanger-support and at a regulable distance from said ring, and means for supporting the lower ends of such tubes at a lesser distance from said central line, whereby the upper gas-receiving ends of the tubes will be more widely spaced from each other and the mantles will be more closely brought together in a cluster.

14. In a gas light fixture, the combination of the hanger-support, means for supplying and regulating the flow of gas therethrough, a tubular ring connected with said hanger support, a cluster of Bunsen burners, and means independent of said ring for supporting the burners, the tubes of said burners being located at an angle to the central vertical line of the fixture, whereby the upper gas-receiving ends of the tubes are separated from each other and the lower mantle-carrying ends thereof are brought toward each other.

15. In a gas light fixture, the combination of a hanger-support, a series of Bunsen burners, means including a tubular ring for supplying and regulating the flow of gas to such burners, a central combustion product flue carried by the hanger-support, means independent of said ring for supporting the upper gas-receiving ends of the tubes of the Bunsen burners at a fixed distance from the central line of such flue and at a regulable distance from said ring, and means for supporting the lower mantle-carrying ends of such tubes closer to the central line of such flue.

16. In a gas light fixture, the combination of the hanger-support, a cluster of Bunsen burners, mantles carried at the lower ends of such burners, means for supplying and regulating the flow of gas thereto, an outwardly and downwardly flaring supporting-plate, means for attaching such plate to the hanger, openings in such supporting-plate, flaring edges for such openings, correspondingly flaring attachments for the upper ends of said burners, whereby said burners will, by their weight, tend to wedge themselves in such support.

17. In a gas light fixture, the combination of the hanger-support, a cluster of Bunsen burners, mantles carried at the lower ends of such burners, means for supplying and regulating the flow of gas thereto, gas valve nozzles directed downwardly into the upper ends of the Bunsen tubes, means for supporting such tubes in connection with the main hanger-support and independently of the valve nozzles, and means for adjusting such tubes longitudinally to and from their respective gas-supplying nozzles.

18. In a gas light fixture, the combination of the hanger-support, a cluster of Bunsen burners, mantles carried at the lower ends of such burners, means for supplying and regulating the flow of gas thereto, gas-supplying nozzles opening downwardly into the upper ends of the Bunsen tubes, supports holding such tubes in fixed relation to the main hanger, loose sleeves revolving in such supports and inclosing such Bunsen tubes, means whereby such tubes are held from dropping through such sleeves and means for causing the tubes to move longitudinally in the sleeves when the latter are revolved.

19. In a gas light fixture, the combination of the hanger-support, a cluster of Bunsen burners, mantles carried at the lower ends of such burners, means for supplying and regulating the flow of gas thereto, gas-supplying nozzles opening downwardly into the upper ends of the Bunsen tubes, supports holding such tubes in fixed relation to the main hanger, loose sleeves revolving in such supports and inclosing such Bunsen tubes, means whereby such tubes are held from dropping through such sleeves, interior screw-threads upon the inclosing sleeves and lugs upon the exterior of the tubes adapted to travel in such screw-threads, whereby the tubes may be adjusted longitudinally of the sleeves.

20. In a gas light fixture, the combination of the hanger-support, a cluster of Bunsen burners, mantles carried at the lower ends of such burners, means for supplying and regulating the flow of gas thereto, gas-supplying nozzles opening downwardly into the upper ends of the Bunsen tubes, supports holding such tubes in fixed relation to the main hanger, loose sleeves revolving in such supports and inclosing such Bunsen tubes, means whereby such tubes are held from dropping through such sleeves, means for causing the tubes to move longitudinally in the sleeves when the latter are revolved, and means for preventing the revolution of the tube when the sleeve is revolved.

21. In a gas light fixture, the combination of the hanger-support, a cluster of Bunsen burners, mantles carried at the lower ends of such burners, means for supplying and regulating the flow of gas thereto, gas-supplying nozzles opening downwardly into the upper ends of the Bunsen tubes, supports holding such tubes in fixed relation to the main hanger, loose sleeves revolving in such supports and inclosing such Bunsen tubes, means whereby such tubes are held from dropping through such sleeves, means for causing the tubes to move longitudinally in the sleeves when the latter are revolved, a longitudinal slot in the tube and a tongue in fixed connection to the hanger-support and entering such slot, whereby revolution of the tube is prevented when the sleeve is revolved.

22. In a gas light fixture, the combination of the hanger-support, a cluster of Bunsen burners, mantles carried at the lower ends of such burners, means for supplying and regulating the flow of gas thereto, and means for supporting said burners independently of and at a distance from the said supply means, said burner tubes having the lower portion thereof vertical, and the upper portion thereof at an angle to the vertical, mantle nozzles alined with the lower vertical course of the tubes and means for detachably clamping together such mantle nozzles and the lower portions of such tubes.

23. In a gas light fixture, the combination of the hanger-support, a cluster of Bunsen burners, mantles carried at the lower ends of such burners, means for supplying and regulating the flow of gas thereto, means for supporting said burners independently of and at a distance from the gas supply means, said burners including tubes having enlarged lower ends, mantle nozzles, means for detachably clamping together such tube ends and such mantle nozzles, mantle-carrying supports, means for suspending such mantle-carrying supports in connection with the Bunsen tubes, and means for adjusting the distance of the suspended mantle-carrying supports from the mantle nozzle.

24. In a gas light fixture, the combination of the hanger-support, a cluster of Bunsen burners, mantles carried at the lower ends of such burners, means for supplying and regulating the flow of gas thereto, said burners including mantle nozzles, tubes having enlarged lower ends, means for detachably clamping together such tube ends and such mantle nozzles, mantle-carrying supports, a loose sleeve surrounding each tube end and mantle nozzle head, hangers carried by such sleeve, and means for adjusting such sleeve upon such tube end.

25. In a gas light fixture, the combination of the hanger-support, a cluster of Bunsen burners, mantles carried at the lower ends of such burners, means for supplying and regulating the flow of gas thereto, and means for supporting said burners independently of and at a distance from the gas supply means, said burners including tubes provided at their lower ends with exteriorly threaded extensions at an angle to the line of the main portion of the tube, mantle nozzles having exteriorly threaded heads, and a clamping screw-threaded ring for uniting the tube extensions and the nozzle heads.

26. In a gas light fixture, the combination of the hanger-support, a cluster of Bunsen burners, mantles carried at the lower ends of such burners, means for supplying and regulating the flow of gas thereto, means for supplying external air to the upper ends of the Bunsen tubes, a deflector plate connected to and immediately carried by the hanger-support, openings in such deflector plate supporting and carrying the Bunsen tubes and openings in such deflector plate above the tube-supporting openings whereby the heated air arising from below will be deflected through such upper openings and away from the upper end of the tubes.

27. In a gas light fixture, the combination of the hanger-support, the entering gas supply pipe, a cluster of Bunsen burners, a controlling valve interposed between the supply pipe and burners, a valve-casing therefor, a pilot light tube normally connected with the main supply pipe, a port through such casing leading to one burner of the cluster, a port through such casing leading to other burners of the cluster, and a port through such casing leading to the pilot light tube and means for manually operating such valve in such casing whereby such ports will be successively opened.

28. In a gas light fixture, the combination of the hanger-support, the entering gas supply pipe, a cluster of Bunsen burners, a controlling valve interposed between the supply pipe and burners, a valve casing therefor, a plurality of ports opening through such casing, conduits from such ports to different portions of the burner cluster, a cross-arm lever for revolving such valve, a slide upon one end thereof, a coiled spring upon which the slide travels as the cross-arm lever changes position, and means for supporting such coiled spring at one end in fixed relation to the valve-casing whereby as the cross-arm is moved and the slide travels upon the spring the latter is distorted and operates as a frictional lock to hold the cross-arm in position.

29. In a gas light fixture, the combination of the hanger-support, the entering gas-supply pipe, a cluster of Bunsen burners, a controlling valve interposed between the supply pipe and burners, a valve-casing therefor, a plurality of ports opening through such casing, conduits from such ports to different portions of the burner cluster, a cross-arm lever for revolving such valve, a slide upon one end thereof, a coiled spring upon which the slide travels as the cross-arm lever changes position, means for holding such spring at one end in fixed relation to the valve-casing, a shoulder upon the other end of such spring, making stop contact with the slide and permitting further revolution of the valve by the extension of the spring and automatically returning the valve to the position indicated by the normal length of the spring.

30. In a gas light fixture, the combination of the hanger-support, the entering gas-supply pipe, a cluster of Bunsen burners, a controlling valve interposed between the supply-pipe and burners, a valve-casing therefor, ports through such casing leading respectively to one burner, to the other burners, and to the pilot, means for manually operating the valve whereby these three ports may be successively opened and means for automatically causing a partial reverse movement of the valve whereby a part of the ports will be automatically closed.

31. In a gas light fixture, the combination of the hanger-support, the entering gas-supply pipe, a cluster of Bunsen burners, a controlling valve interposed between the supply-pipe and burners, a valve-casing therefor, a cross-arm lever on such valve, whereby it may be manually revolved, a slide at one end of such lever inclosing and traveling upon the coiled spring, the coiled spring held at one end in fixed relation to the valve-casing, and adjustable means connecting such spring with such casing whereby the position of the spring with reference thereto may be adjusted.

32. In a gas light fixture, the combination of the entrance supply-pipe, the hanger-arms depending therefrom, a cluster of Bunsen burners, means for supplying gas from such pipe to such burners and regulating the flow thereof, a central combustion product flue, means whereby such flue is adjustably supported and carried by such hanger-arms, an outwardly and downwardly flaring deflector plate attached to and carried by such flue, openings toward the lower part of such plate for separating and carrying the tubes of the Bunsen burners and openings toward the upper part of such plate and surrounding such flue for permitting the heated air to pass upward therethrough.

33. In a gas light fixture, the combination of the entrance supply-pipe, the hanger-arms depending therefrom, a cluster of Bunsen burners, means for supplying gas from such pipe to such burners and regulating the flow thereof, a central combustion product flue, means whereby such flue is adjustably supported and carried by such hanger-arms, an outwardly and downwardly flaring deflector plate attached to and carried by such flue, openings toward the lower part of such plate for separating and carrying the tubes of the Bunsen burners, openings toward the upper part of such plate and surrounding such flue for permitting the heated air to pass upward therethrough, and a supplemental flue inclosing and surrounding the primary flue and serving to conduct away the heated air which does not enter the primary flue.

In testimony whereof I have hereunto set my hand in presence of two subscribing witnesses.

JOSEPH MAAS.

Witnesses:
    JAY D. DRIVER,
    GLENNO MEAD.